(12) United States Patent
Heath et al.

(10) Patent No.: US 7,816,431 B2
(45) Date of Patent: Oct. 19, 2010

(54) COMPOSITE COMPOSITIONS

(75) Inventors: Richard B. Heath, Morristown, NJ (US); James E. Garft, Yardley, PA (US); Levante E. Koller, Andover, NJ (US)

(73) Assignee: Honeywell International Inc., Morristown, NJ (US)

( * ) Notice: Subject to any disclaimer, the term of this patent is extended or adjusted under 35 U.S.C. 154(b) by 989 days.

(21) Appl. No.: 10/941,766

(22) Filed: Sep. 14, 2004

(65) Prior Publication Data
US 2005/0154095 A1   Jul. 14, 2005

(51) Int. Cl.
C08G 18/38 (2006.01)
C08L 97/02 (2006.01)
C08L 1/00 (2006.01)
B29C 47/00 (2006.01)

(52) U.S. Cl. .............. 524/13; 524/14; 524/35; 523/129; 264/211; 264/320; 264/328.18

(58) Field of Classification Search ........... 264/211, 264/320, 328.18; 524/13, 14, 76, 35; 523/129
See application file for complete search history.

(56) References Cited

U.S. PATENT DOCUMENTS

| | | | |
|---|---|---|---|
| 3,578,621 A | 5/1971 | Staphfer | 260/31.6 |
| 3,645,939 A * | 2/1972 | Gaylord | 525/54.23 |
| 3,875,069 A * | 4/1975 | Worschech et al. | 508/482 |
| 3,882,194 A | 5/1975 | Krebaum et al. | 260/878 |
| 3,943,079 A | 3/1976 | Hamed | 260/17.4 |
| 4,338,228 A | 7/1982 | Inoue et al. | 524/120 |
| 4,404,312 A | 9/1983 | Kokubu et al. | 524/504 |
| 4,409,345 A * | 10/1983 | Moteki et al. | 524/13 |
| 4,487,874 A | 12/1984 | Linder | 524/311 |
| 5,001,197 A | 3/1991 | Hendewerk | 525/285 |
| 5,120,776 A | 6/1992 | Raj et al. | 524/13 |
| 5,346,930 A | 9/1994 | Maine et al. | 523/164 |
| 5,849,209 A | 12/1998 | Kindt-Larsen et al. | 249/134 |
| 5,866,641 A | 2/1999 | Ronden et al. | 523/219 |
| 5,886,066 A | 3/1999 | Forschirm | 523/200 |
| 5,936,018 A | 8/1999 | Müller et al. | 524/318 |
| 5,973,035 A | 10/1999 | Medoff et al. | 524/13 |
| 5,981,067 A | 11/1999 | Seethamraju et al. | 428/393 |
| 5,997,784 A | 12/1999 | Karnoski | 264/51 |
| 6,011,091 A | 1/2000 | Zehner | |
| 6,069,195 A | 5/2000 | Lindner | 524/313 |
| 6,180,257 B1 | 1/2001 | Brandt et al. | 428/532 |
| 6,355,208 B1 | 3/2002 | Unami et al. | |

(Continued)

FOREIGN PATENT DOCUMENTS

DE   19934377   * 1/2001

(Continued)

OTHER PUBLICATIONS

D. Maldas and B. V. Kokta, J. Adhesion Sci. Technol. vol. 5, No. 9, pp. 727-740 (1991).

*Primary Examiner*—Cephia D Toomer
(74) *Attorney, Agent, or Firm*—Carrie A. Beatus

(57) ABSTRACT

Disclosed are composite compositions well suited for forming shaped articles which comprise thermoplastic polymer, cellulose, a coupling agent comprising anhydride moities, and a lubricant comprising an alkyl ester of carboxylic acid. Preferably the lubricant is substantially free of zinc stearate.

22 Claims, 1 Drawing Sheet

U.S. PATENT DOCUMENTS 6,579,605 B2 * 6/2003 Zehner .................. 428/319.9

FOREIGN PATENT DOCUMENTS

| | | |
|---|---|---|
| EP | 0654500 A1 | 5/1995 |
| EP | 0057967 A1 | 8/2008 |
| JP | 58-217552 A | 12/1983 |
| JP | 07-102145 A | 4/1995 |
| JP | 07-188489 A | 7/1995 |
| JP | 09-040878 A | 2/1997 |
| JP | 10-265614 A | 10/1998 |
| JP | 10-286863 A | 10/1998 |
| JP | 11-279355 A | 10/1999 |
| JP | 2002-138202 A | 5/2002 |

* cited by examiner

COMPOSITE COMPOSITIONS

CROSS REFERENCE TO RELATED APPLICATIONS

This application is related to and claims the priority of U.S. application Ser. No. 10/123,757, filed Apr. 16, 2002, which in turn is related to and claims the priority benefit of U.S. Provisional Application No. 60/284,131, filed Apr. 16, 2001, each of which is incorporated herein by reference.

FIELD OF THE INVENTION

The present invention relates to composite compositions comprising thermoplastic polymer and cellulosic fibers, to lubricant/coupling agents for such composite compositions, and to structural members and structures formed from such compositions. The composites of the present invention are well-suited for use as wood substitutes when formed into structural members.

BACKGROUND

Composite materials which comprise an organic resin and a filler have been known and used for a number of years. For example, there has been a need to find materials that exhibit the look and feel of natural wood. One reason for this need relates to efforts to conserve the limited supply of natural wood for construction purposes from the world's forest. Another reason is that certain composite materials can exhibit properties that are superior to natural wood in certain respects. For example, it is possible to formulate composite materials into synthetic wood that has enhanced moisture resistance.

In addition to the general cost and difficulty associated with wholesale use of wood products in construction, much of the wood in general board fabrication is wasted material. A substantial amount of sawdust is created together with pulp materials such as branches or the like as the lumber producers endeavor to transform a harvested tree into a collection of elongated boards and planks for use in fabrication of structures. Attempts have thus been made to manufacture products as substitutes for virgin wood utilizing wood fiber or particles together with various binder materials. Such products have become available and are generally known as "fiber board" or "particle board." In addition, the use of wood particles or fibers together with plastic binders have created so-called plastic wood. As a result, cellulose and related materials are highly desirable material for use in composites in general, and in composites intended for use as wood substitutes in particular.

One problem associated with manufacture and effectiveness of such composite materials is the ability to strongly bind the cellulosic fibers and the thermoplastic binder. Adhesion stability between the filler and the resinous mixture has been recognized as a source of degradation and failure of these materials for nearly as long as such materials have been known. As reported in U.S. Pat. No. 5,981,067, one solution to this problem involves enhancing polymer-fiber compatibility, that is, the tendency of the polymer and fiber to mix and/or adhere to one another. U.S. Pat. No. 5,120,776, which is incorporated herein by reference, teaches cellulosic fibers pretreated with maleic or phthalic anhydride to improve the bonding and dispersibility of the fiber in the polymer matrix. Also of relevance in this regard is Maldas and Kokta, "Surface modification of wood fibers using maleic anhydride and isocyanate as coating components and their performance in polystyrene composites", Journal Adhesion Science Technology, 1991, pp. 1-14.

While maleic anhydride-based coupling agents have been suggested for use in making composite materials, there has been a decided absence of success in the use of such materials in commercial applications.

Commercial applications of composite compositions frequently involves the shaping of such compositions by molding, extrusion or the like. In order for such operations to be practically effective in a commercially competitive environment, it is necessary that such processes be carried out at a relative high rate and with a minimum of operational problems. Toward this end, the use of additives in the composite composition to aid in the processing thereof are practically essential. One commonly used processing aid is a lubricant or release agent, which allows the effective processing of such composites at commercially acceptable speeds. Metal stearates, and in particular zinc stearate, are frequently used in lubricant packages for composites involving thermoplastic polymers and cellulosic filler. See for example U.S. Pat. No. 6,180,257 B1 (col., 2, 11. 26-28).

SUMMARY OF THE INVENTION

The present invention has several aspects, including novel lubricant compositions, novel composite compositions, novel structural members and novel methods of manufacture. Each of these aspects flows, at least in part, from the recognition by the present inventors that certain lubricants, and in particular metal carboxylate lubricants, such as metal stearates, can negatively affect the performance of certain desirable coupling agents, and the discovery that certain lubricants operate in a synergistic manner with such coupling agents to produce unexpectedly superior performance.

Applicants have discovered composite compositions well suited for forming shaped articles, such composition comprising polymer (preferably thermoplastic polymer), cellulose, a coupling agent comprising carboxylic functionality (for example, anhydride moieties), and a lubricant comprising electrophilic functionality (for example alkyl ester of a carboxylic acid or a functional derivative thereof). According to highly preferred embodiments, the lubricant is free of an antagonistic amount of metal carboxylate, such as metal stearate, and is even more preferably is substantially free of metal carboxylate, such as metal stearate. As used herein, the term antagonistic amount refers to an amount of metal carboxylate which has a more than nominal negative impact on the properties of the composite (especially the processing properties, such as extrudeability) as compared to the same composite without any such metal carboxylate.

The present invention also provides lubricant compositions comprising an alkyl ester and an amide ester.

The methods of the present invention comprise forming a composite of the present invention into a shaped article, preferably by extruding the composite.

DESCRIPTION OF PREFERRED EMBODIMENTS

Figure 1:
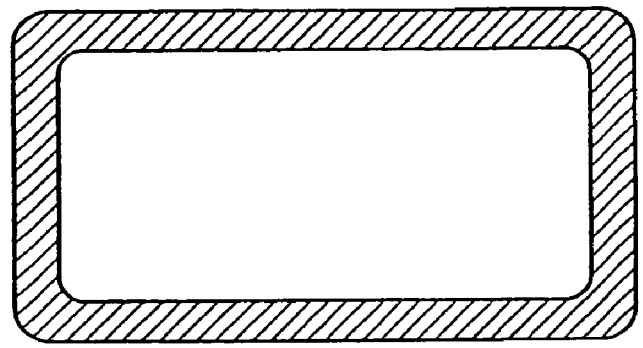
FIG. 1 is a cross-sectional, semi-schematic view of one structural member in accordance with one embodiment of the present invention.

The invention is directed to composite compositions which may be fabricated at high rates into shaped articles, and in particular structural members, exhibiting desirable strength properties. Generally, the composition preferably comprises from about 10 to about 50 parts by weight of thermoplastic polymer, from about 50 to about 90 parts by weight of cellulosic fiber, effective amounts of a coupling agent and effective amounts of lubricant in accordance with the present invention. As used herein, the term effective amount refers to any amount which produces a noticeable, and preferably a substantial, improvement in the corresponding performance of the composition. With respect to coupling agents, therefore, an effective amount of a coupling agent produces a noticeable improvement in the compatibility of and/or adherence between the thermoplastic an the cellulosic fiber, which will typically although not exclusively be manifested in an improvement in the tensile strength of the shaped article. With respect to lubricant, an effective amount produces a noticeable improvement in the processability of the composition, which will typically although not exclusively be manifested in an improvement in the speed and/or efficiency with which the composition can be effectively formed, and preferably extruded, into a shaped article.

According to certain preferred embodiments, the composite composition preferably comprises from about 20 to about 40 parts by weight, and even more preferably from about 25 to about 35 parts by weight of thermoplastic polymer, from about 50 to about 80 parts by weight, and even more preferably from about 50 to about 65 parts by weight, of cellulosic fiber, from about 1 to about 5 parts by weight of coupling agent, and from about 1 to about 5 parts by weight of lubricant.

Preferred embodiments of the present compositions produce shaped articles with unexpectedly improved performance properties relative to prior art compositions. More particularly, preferred composite compositions which include maleic anhydride-based coupling agents and lubricating agent in accordance with the present invention produce shaped articles with tensile strength properties that exhibit a tensile strength which is at least about 25 relative percent, and even more preferably at least about 50 relative percent, greater than the same compositions containing substantial amounts of the commonly used prior art lubricant zinc stearate. The preferred composite compositions of the present invention exhibit a tensile strength of at least about 2000 psi, more preferably at least about 2500 psi, and even more preferably 3000 psi.

Another substantial and unexpected advantage of the present invention, and particularly the present lubricant compositions, is a cost advantage which derives from the improved processing performance of the present lubricants. More particularly, the present lubricants are more effective in enhancing the formability, and particularly the extrudeability, of the composite compositions. This improvement is illustrated by the fact that the present compositions can be formed at substantially the same rate as those compositions using prior art zinc stearate lubricants with a lubricant loading that is no greater than about 90 relative percent, and even more preferably no greater than about 75 relative percent, of the loading required by the prior art to achieve the same processing speed.

The Thermoplastic Polymer

It is contemplated that any substantially thermoplastic polymer is adaptable for use in accordance with the present invention. For example, it is contemplated that thermoplastic polymer useful in the present compositions may include polyamides, polyvinyl halides, polyesters, polyolefins, polyphenylene sulfides, polyoxymethylenes, styrene polymers, and polycarbonates. Particular preferred is polyolefin polymer.

The primary requirement for the substantially thermoplastic polymeric material is that it retain sufficient thermoplastic properties to permit melt blending with cellulosic fiber and permit effective formation into shaped articles by extrusion or molding in a thermoplastic process. It is thus contemplated that minor amounts of thermosetting resins may be included in the present compositions without sacrificing these essential properties. Both virgin and recycled (waste) polymers can be used.

As used herein, the term polyolefin refers to homopolymers, copolymers and modified polymers of unsaturated aliphatic hydrocarbons. Among the preferred polyolefins, polyethylene and polypropylene are most preferred. Especially preferred is high density polyethylene (HDPE). For economic and environmental reasons, regrinds of HDPE from bottles and film are preferred.

The Cellulose Fibers

The present compositions include filler that comprises cellulose. The filler component may be comprised of reinforcing (high aspect ratio) filler, non-reinforcing (low aspect ratio) filler, and combinations of both reinforcing and non-reinforcing filler. Aspect ratio is defined as the ratio of the length to the effective diameter of the filler particle. High aspect ratio offers an advantage, i.e., higher strength and modulus for the same level of filler content. Inorganic fillers, such as glass fibres, carbon fibres, talc, mica, kaolin, calcium carbonate and the like, may be included as an optional supplement to the cellulose. In addition, other organic fillers, including polymeric fiber, may also be used.

The cellulose filler in accordance with the present invention is particularly important and preferred because of its low cost and for other reasons, such as light weight, ability to maintain high aspect ratio after processing in high intensity thermokinetic mixer and low abrasive properties (thus, extending machine life). The cellulose may be derived from any source, including wood/forest and agricultural by-products. The cellulose fiber may include hard wood fiber, soft wood fiber, hemp, jute, rice hulls, wheat straw, and combinations of two or more of these. In ceratin embodiments, the cellulose preferably comprises high aspect ratio fiber, such as are present in hard woods, in a substantial proportion. However, such high aspect ration fibers are generally more difficult to process and therefore may be less desirable in embodiments in which processing speed and efficiency are particularly important considerations.

The Coupling Agent

As used herein, the term coupling agent refers to a compound or composition which tends to promote dispersion and/or compatibilization of the cellulose particles and the thermoplastic polymer. In general, compounds, including organic polymers, with electrophilic functionality, and in particular carboxylic functionality, have been found to be potentially effective for this purpose, and it is contemplated that all such compounds are adaptable for use in accordance with the present invention. Preferred organic compounds include polymers with maleic anhydride functionality.

It is contemplated that numerous compounds having maleic anhydride functionality can be used in accordance with the present invention in view of the teachings contained herein, and all such compounds or combinations of compounds are within the scope of this invention. In certain embodiments, functionalized polymers are preferred, particularly maleated polyolefin polymers.

As those skilled in the art will appreciate from the disclosure contained in the present application, the particular properties and characteristics of functionalized polymers used in accordance with the present invention can be varied widely to accommodate the particular needs of numerous applications. In general, however, applicants have found that it is frequently desirable to select functionalized polymers which have a backbone that corresponds generally to at least a portion of the thermoplastic polymer of the composite. For example, in embodiments of the present invention in which the thermoplastic polymer is polyethylene, it may be preferred to utilize functionalized polyethylene as the coupling agent. Similarly, for embodiments in which the thermoplastic polymer comprises polypropylene, it may be preferred to utilize functionalized polypropylene as the coupling agent. Applicants have surprisingly discovered, however, a coupling agent which is highly effective for use in connection with both different polyolefin polymers, more preferably $C_2$-$C_4$ polyolefins, and even more preferably polyethylene and polypropylene. For the embodiments of the present invention in which it is desirable to have a coupling agent which can be used with a high degree of effectiveness in a wide variety of composite compositions, applicants have discovered that is preferred to utilize a maleated polypropylene polymer, and particular polypropylene having a molecular weight of from about 10,000 to about 15,000 and about 1.5 to about 2.5 maleic anhydride functionalities, on average, per polymer chain. More generally for embodiments in which the thermoplastic polymer comprises polyolefin, it is preferred that the coupling agent comprise functionalized polyolefin, and preferably functionalized polyethylene, functionalized polypropylene, and/or combinations of functionalized polyethylene and functionalized polypropylene having a molecular weight of from about 10,000 to about 25,000 (and even more preferably from about 10,000 to about 20,000) and about 0.6 to about 3 maleic anhydride functionalites (and even more preferably from about 0.8 to about 2.5), on average, per polymer chain. Such functionalized polyolefins are available, for example, from Honeywell International under trade designations A-C 1221, 597, 596 and 575. In additional, functionalized polyethylene and polypropylene are disclosed in U.S. Pat. Nos. 3,882,194, 4,404,312 and 5,001,197, each of which is incorporated herein by reference.

It is contemplated that in certain embodiments it may be preferred to use silane coupling agent(s) alone or in combination with other preferred coupling agents. Of course other effective coupling compounds not specifically mentioned herein, but which are now known or become known to those skilled in the art, may also be used in addition to, or in certain cases as substitutes for, the preferred coupling agents described herein.

The Lubricant

The present compositions include an effective amount of a lubricant or a lubricant package. In one embodiment, the lubricant comprises alkyl ester. Particularly preferred are polyol esters formed by the reaction of polyol (that is, polyhydroxyl compounds) with one or more mono- or poly-basic carboxylic acid or carboxylic acid functional groups.

Among the polyols are those represented by the general formula $R(OH)_n$ wherein R is any aliphatic or cyclo-aliphatic hydrocarbyl group (preferably an alkyl) and n is at least 2. The hydrocarbyl group may contain from about 2 to about 20 or more carbon atoms, and the hydrocarbyl group may also contain substituents such as chlorine, nitrogen and/or oxygen atoms. The polyhydroxyl compounds generally may contain one or more oxyalkylene groups and, thus, the polyhydroxyl compounds include compounds such as polyetherpolyols. The number of carbon atoms (i.e., carbon number, wherein the term carbon number as used throughout this application refers to the total number of carbon atoms in either the acid or alcohol as the case may be) and number of hydroxy groups (i.e., hydroxyl number) contained in the polyhydroxyl compound used to form the carboxylic esters may vary over a wide range.

The following alcohols are particularly useful as polyols: neopentyl glycol, trimethylolethane, trimethylolpropane, trimethylolbutane, mono-pentaerythritol, technical grade pentaerythritol, and di-pentaerythritol. The most preferred alcohols are technical grade (e.g., approximately 88% mono-, 10% di- and 1-2% tri-pentaerythritol) pentaerythritol, mono-pentaerythritol, and di-pentaerythritol.

Preferred carboxylic acids include any $C_2$ to $C_{20}$ mono- and di-acids, including preferably adipic and stearic acid.

Functional derivatives of carboxylic acids may also be used to form the lubricating agent. For example, anhydrides of polybasic acids can be used in place of the polybasic acids, when esters are being formed. These include, for example, succinic anhydride, glutaric anhydride, adipic anhydride, maleic anhydride, phthalic anhydride, trimellitic anhydride, nadic anhydride, methyl nadic anhydride, hexahydrophthalic anhydride, stearic anhydride and mixed anhydrides of polybasic acids. Particularly preferred lubricating compounds in accordance with the present invention are the complex esters described in U.S. Pat. Nos. 4,487,874 and 6,069,195, each of which is incorporated herein by reference.

The preferred alkyl ester of the present invention comprises a mixture of alkyl esters of the formula 1 below,

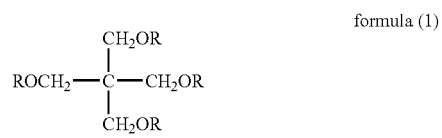

formula (1)

wherein:

R is independently hydrogen, or —C(O)R' and wherein at least on of R is —C(O)R';

R' is hydrogen, an unsaturated or saturated alkyl chain having from about 3 to about 18 carbon atoms, or —C(O)—X—COOH; and X is a unsaturated or saturated alkyl chain, which may be mono- or poly-valent, having from about 3 to about 18 carbon atoms.

The alkyl ester preferably comprises pentaerythritol adipate-stearate, which is a mixture of alkyl esters of formula 1 wherein about 14% of the organic moieties are —C(O)—X—COOH moieties derived from adipic acid and about 71% of the organic moieties are —C(O)R' moieties derived from stearic acid and its associated acids (chiefly palmitic acid). Such material is sold under the trade designation RL 710 by Honeywell International Inc.

The lubricant packages in accordance with the present invention also preferably include carboxyamide wax, and even more preferably stearamide wax, as disclosed in U.S. Pat. No. 3,578,621, which is incorporated herein by reference. Especially preferred is ethylenebis stearamide ("EBS").

Although it is contemplated that the alkyl ester and the amide wax may be used over a wide range of relative concentrations in the lubricant package, it is preferred that the weight ratio alkyl ester to amide wax is from about 30:1 to about 1:1, with 20:1 to about 2:1 being more preferred.

According to preferred embodiments, the lubricating package contains no more than about 25% by weight of metal carboxylate, even more preferably no more than 10% by weigh of metal carboxylate, and most preferably is substantially free of metal carboxylate. According to highly preferred embodiments, the lubricating package contains no more than about 25% by weight of zinc stearate, even more preferably no more than 10% by weigh of zinc stearate, and most preferably is substantially free of zinc stearate.

With respect to the composite composition, it is generally preferred that the composite contains no more than 0.5% by weight of metal carboxylate, and more preferably no more than 0.25% by weigh of metal carboxylate. It is especially preferred that the composite contains no more than 0.5% by weight of zinc stearate, and more preferably no more than 0.25% by weigh of zinc stearate.

According to certain embodiments, the lubricant comprises hydrogenated castor oil.

Additive Packages

One aspect of the present invention involves additive compositions useful in connection with the formation of composite compositions having advantageous processing and end-use properties. More particularly, the additive packages comprise a unique combination of lubricating agents and/or coupling agents which are effective at improving the processing characteristics of the composite without detracting from, and in some cases enhancing, the strength characteristics of the finished product.

In certain preferred embodiments, the additive is a lubricating agent which contains less than an antagonistic amount of metal carboxylate. Particularly preferred lubricants in accordance with the present invention are substantially free of metal carboxylate and comprises a major proportion by weight of alkyl ester and/or hyrdrogenated Castor Oil, and a minor proportion by weight of carboxyamide wax. In certain embodiments, the lubricating package further comprises a minor proportion by weight of polyolefin, preferably a polyethylene or polypropylend, and even more preferably substantially linear polyethylene or polypropylene. In certain preferred embodiments, the lubricating composition comprises from about 80 parts by weight to about 97 parts by weight of a compound selected from the group of alkyl esters, hydrogenated castor oils, and combinations of two or more of these, from about 1 part to about 10 parts by weight of carboxyamide wax and from about 1 part to about 10 parts by weight of polyolefin.

Although it is contemplated that the lubricating packages of the present invention can beneficially be used alone in certain embodiments, it is generally preferred to provide an additive package which includes a lubricant agent/package according to the present invention in combination with a coupling agent/package in accordance with the present invention. Furthermore, while it is contemplated that these packages can be combined in a wide range of relative proportions in accordance with the present invention, it is generally preferred to provide an additive package having a lubricant: coupling agent weight ratio of from about 1:1 to about 4:1, and even more preferably in certain embodiments of about 3:2.

The Structural Members

Figure 2:
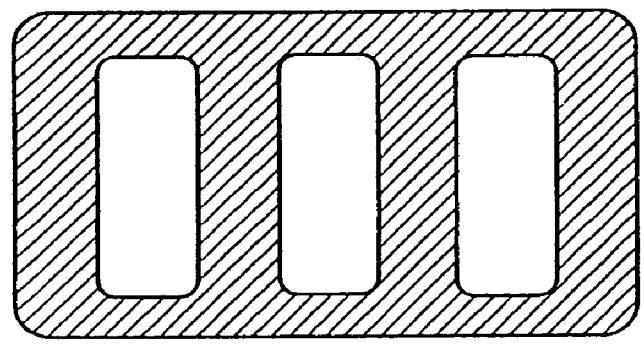
FIG. 2 is a cross-sectional, semi-schematic view of one structural member in accordance with another embodiment of the present invention.
Figure 3:
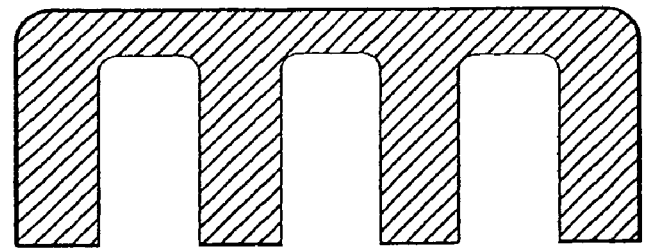
FIG. 3 is a cross-sectional, semi-schematic view of one structural member in accordance with another embodiment of the present invention.

As indicated previously, the present compositions can be used to form a wide variety of structural members, and all such structural members are within the broad scope of the present invention. Applicants have found, however, that the present methods and compositions can be utilized to form structural members, and particularly extruded structural members, that would otherwise be exceptionally difficult to form and/or practically unfeasible from an economic stand point because of high processing costs. More specifically with respect to FIGS. 1-3, it can be seen that the present invention includes structural members that are at once both strong and lightweight. It will be appreciated by those skilled in the art that such lightweight structural members would not have been practically possible to manufacture by extrusion from prior composite compositions because of the high cross-sectional area of the structures. More particularly, the present composite compositions have a unique combination of high-strength and high lubricity that permit the extrusion of such high surface area configurations under relatively higher rate, economical extrusion conditions. Applicants believe that such structural members could not have been produced in a commercially efficient and cost-effective manner in accordance with prior art techniques.

The Methods

The present methods involve forming a shaped article comprising the steps providing a composite composition in accordance with the invention as described herein and forming said composition into the desired shaped article. The composition can be provided by combing the components in accordance with any of the techniques well known in the art for combing components to form homogeneous composite compositions, as disclosed in U.S. Pat. Nos. 3,943,079; 4,338,228; 5,886,066; and 5,997,784 each of which is incorporated herein by reference.

The forming step can also comprise any of the techniques well known in the art for forming homogeneous composites into shaped articles, including injection molding and extruding, as disclosed in the aforementioned patents. Forming by extrusion is preferred.

COMPARATIVE EXAMPLE 1

The present comparative example does not necessarily represent an item of prior art and may in fact be closer to the present invention than the closest item of prior art. Nevertheless, this example serves as a basis for illustrating the superior performance of the present invention.

A composite composition is prepared by extrusion compounding 62 parts by weight ("pbw") of wood fiber, 33 pbw of HDPE, 2 pbw of maleated polyethylene coupling agent, and 3 pbw of a lubricant consisting essentially of EBS and zinc stearate in a 1:2 weight ratio.

The composite composition is formed into a shaped article by known methods under known conditions. The resultant article exhibits a tensile strength of approximately 2000 psi.

EXAMPLE 1

A composite composition is prepared by extrusion compounding 62.8 parts by weight ("pbw") of wood fiber, 33 pbw of HDPE, 2 pbw of maleated polyethylene coupling agent, and 2.2 pbw of a lubricant consisting essentially of EBS, zinc stearate and pentaerythritol adipate-stearate in a 1:1:20 weight ratio.

The composite composition is formed into a shaped article by the same methods under the same conditions as in the comparative example. The resultant article exhibits a tensile strength of approximately 2900 psi, representing an improvement of 45% over the comparative example.

EXAMPLE 2

A composite composition is prepared by extrusion compounding 62.75 parts by weight ("pbw") of wood fiber, 33 pbw of HDPE, 2 pbw of maleated polyethylene coupling agent, and 2.25 pbw of a lubricant consisting essentially of EBS and pentaerythritol adipate-stearate in a 2.5:20 weight ratio.

The composite composition is formed into a shaped article by the same methods under the same conditions as in the comparative example. The resultant article exhibits a tensile strength of approximately 3500 psi, representing an improvement of 75% over the comparative example.

EXAMPLE 3

A composite composition is prepared by extrusion compounding 62.5 parts by weight ("pbw") of wood fiber, 33 pbw of HDPE, 2 pbw of maleated polyethylene coupling agent, and 2.5 pbw of a lubricant consisting essentially of pentaerythritol adipate-stearate.

The composite composition is formed into a shaped article by the same methods under the same conditions as in the comparative example. The resultant article exhibits a tensile strength of approximately 3200 psi, representing an improvement of 60% over the comparative example.

COMPARATIVE EXAMPLE 2

The present comparative example does not necessarily represent an item of prior art and may in fact be closer to the present invention than the closest item of prior art. Nevertheless, this example serves as a basis for illustrating the superior performance of the present invention.

A composite composition is prepared by extrusion compounding 60.5 parts by weight ("pbw") of wood fiber, 33 pbw of HDPE, 2 pbw of maleated polyethylene coupling agent, and 4.5 pbw of a lubricant consisting essentially of EBS and zinc stearate in a 1:2 weight ratio.

The composite composition is formed into a shaped article by known extrusion methods under known conditions.

EXAMPLE 4

A composite composition is prepared by extrusion compounding 62 parts by weight ("pbw") of wood fiber, 33 pbw of HDPE, 2 pbw of maleated polyethylene coupling agent, and 3 pbw of a lubricant consisting essentially of EBS and pentaerythritol adipate-stearate in a 2.5:20 weight ratio.

The composite composition is formed into a shaped article by the same methods under the same conditions as in the comparative example 2. Despite using approximately 50 percent less on both a weight and cost basis of lubricant than comparative example 2, the forming operation proceeds at least as efficiently as and at at least about the same production rate as in comparative example 2.

What is claimed is:

1. A composition for forming shaped articles comprising:
    cellulosic fiber;
    thermoplastic binder;
    a coupling agent containing maleic anhydride or maleic anhydride functionality; and
    a lubricant consisting essentially of at least one polyol ester of carboxylic acid, carboxyamide wax, and less than about 25 wt. % of metal stearate.

2. The composition of claim 1 wherein said lubricant consists essentially of at least one polyol ester of carboxylic acid, carboxyamide wax, and less than about 10 wt. % of metal stearate.

3. The composition of claim 1 wherein said lubricant is substantially free of metal stearate.

4. The composition of claim 1 wherein said polyol ester and said amide wax are present in a weight ratio of polyol ester to amide wax of from about 30:1 to about 1:1.

5. The composition of claim 4 wherein said polyol ester and an amide wax are present in a weight ratio of from about 20:1 to about 2:1.

6. The composition of claim 1 wherein said thermoplastic binder is present in the composition in an amount of from about 20 parts by weight to about 40 parts by weight, said cellulose is present in an amount of from about 50 parts by weight to about 80 parts by weight, said coupling agent is present in an amount of from about 1 parts by weight to about 5 parts by weight, and said lubricant is present in an amount of from about 1 parts by weight to about 5 parts by weight.

7. The composition of claim 6 in the form of a shaped article.

8. The composition of claim 6 in the form of a shaped article having a tensile strength of at least about 2000 psi.

9. The composition of claim 6 in the form of a shaped article having a tensile strength of at least about 2500 psi.

10. The composition of claim 6 in the form of a shaped article having a tensile strength of at least about 3000 psi.

11. The composition of claim 6 wherein said thermoplastic binder comprises polyolefin.

12. The composition of claim 11 wherein said polyolefin comprises polyethylene.

13. A method of manufacturing a shaped article comprising:
    a) providing a formable composite composition comprising cellulosic fiber, thermoplastic binder; a coupling agent comprising maleic anhydride moieties and a lubricant consisting essentially of at least one polyol ester of carboxylic acid, carboxyamide wax, and less than about 25 wt. % of metal stearate; and
    b) forming said formable composition into a shaped article.

14. The composition of claim 1 wherein said a coupling agent comprising a polyolefin having from about 0.6 to about 3 maleic anhydride functionalities on average per polymer chain and a molecular weight of from about 10,000 to about 25,000.

15. The composition of claim 14 wherein said coupling agent comprises polyolefin having from about 1.5 to about 2.5 maleic anhydride functionalities on average per polymer chain and a molecular weight of from about 10,000 to about 15,000.

16. The composition of claim 14 wherein said coupling agent comprises maleated polypropylene.

17. The composition of claim 14 wherein said coupling agent comprises maleated polyethylene.

18. The composition of claim 14 wherein said thermoplastic binder is present in the composition in an amount of from about 20 parts by weight to about 40 parts by weight, said cellulose is present in an amount of from about 50 parts by weight to about 80 parts by weight, said coupling agent is present in an amount of from about 1 parts by weight to about 5 parts by weight, and said lubricant is present in an amount of from about 1 parts by weight to about 5 parts by weight.

19. An extruded article of manufacture made from a method in accordance with claim 13.

20. A composition for forming shaped articles comprising:
cellulosic fiber;
thermoplastic binder;
a coupling agent containing maleic anhydride or maleic anhydride functionality; and
a lubricant consisting essentially of at least one polyol ester of carboxylic acid and less than about 25 wt. % of metal stearate.

21. A composition for forming shaped articles comprising:
cellulosic fiber;
thermoplastic binder;
a coupling agent containing maleic anhydride or maleic anhydride functionality; and
a lubricant consisting essentially of at least one alkyl ester of carboxylic acid, carboxyamide wax, and less than about 25 wt. % of metal stearate;

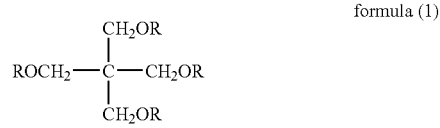

wherein said alkyl ester comprises a mixture of alkyl esters of formula (1):
wherein:
R' is independently hydrogen, or —C(O)R' provided that at least one R is —C(O)R';
R' is an unsaturated or saturated alkyl chain having from about 3 to about 18 carbon atoms, or —C(O)—X—COOH; and
X is an unsaturated or saturated alkyl chain having from about 3 to about 18 carbon atoms.

22. The composition of claim 21 wherein said mixture of alkyl esters comprises pentaerythritol adipate-stearate.

* * * * *

UNITED STATES PATENT AND TRADEMARK OFFICE
CERTIFICATE OF CORRECTION

| | |
|---|---|
| PATENT NO. | : 7,816,431 B2 |
| APPLICATION NO. | : 10/941766 |
| DATED | : October 19, 2010 |
| INVENTOR(S) | : Richard B. Heath et al. |

It is certified that error appears in the above-identified patent and that said Letters Patent is hereby corrected as shown below:

On the Front Page of the Patent, after:

(65)        Prior Publication Data
        US 2005/0154095 A1   Jul. 14, 2005

Please insert:

-- Related U.S. Application Data
Continuation of application No. 10/123,757, filed on April 16, 2002, now abandoned,
which claims benefit of Provisional application No. 60/284,131, filed on April 16, 2001 --

Signed and Sealed this
Twenty-fifth Day of January, 2011

David J. Kappos
*Director of the United States Patent and Trademark Office*